(12) United States Patent
Mikhaylik et al.

(10) Patent No.: US 10,020,479 B2
(45) Date of Patent: Jul. 10, 2018

(54) SELF-HEALING ELECTRODE PROTECTION IN ELECTROCHEMICAL CELLS

(71) Applicant: Sion Power Corporation, Tucson, AZ (US)

(72) Inventors: Yuriy V. Mikhaylik, Tucson, AZ (US); Michael G. Laramie, Tucson, AZ (US); David Child, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 501 days.

(21) Appl. No.: 14/455,230

(22) Filed: Aug. 8, 2014

(65) Prior Publication Data

US 2015/0044517 A1 Feb. 12, 2015

Related U.S. Application Data

(60) Provisional application No. 61/863,502, filed on Aug. 8, 2013.

(51) Int. Cl.
| | |
|---|---|
| *H01M 2/16* | (2006.01) |
| *H01M 10/42* | (2006.01) |
| *H01M 10/056* | (2010.01) |
| *H01M 4/36* | (2006.01) |
| *H01M 4/134* | (2010.01) |
| *H01M 4/38* | (2006.01) |
| *H01M 4/62* | (2006.01) |

(Continued)

(52) U.S. Cl.
CPC ......... *H01M 2/1686* (2013.01); *H01M 4/134* (2013.01); *H01M 4/366* (2013.01); *H01M 4/382* (2013.01); *H01M 4/62* (2013.01); *H01M 10/056* (2013.01); *H01M 10/4235* (2013.01); *H01M 2/1646* (2013.01); *H01M 2/1673* (2013.01); *H01M 10/052* (2013.01); *H01M 10/0525* (2013.01); *H01M 2004/027* (2013.01); *H01M 2200/00* (2013.01); *H01M 2300/0068* (2013.01)

(58) Field of Classification Search
None
See application file for complete search history.

(56) References Cited

U.S. PATENT DOCUMENTS

| | | | |
|---|---|---|---|
| 4,664,991 A | 5/1987 | Perichaud et al. | |
| 4,739,018 A | 4/1988 | Armand et al. | |

(Continued)

FOREIGN PATENT DOCUMENTS

| | | |
|---|---|---|
| WO | WO 1999/033125 A1 | 7/1999 |
| WO | WO 1999/033130 A1 | 7/1999 |

(Continued)

OTHER PUBLICATIONS

Alamgir et al., Lithium Batteries, New Materials, Developments and Perspectives, Chapter 3. Elsevier, Amsterdam. 1994; 93-136.

(Continued)

*Primary Examiner* — Jonathan Crepeau
(74) *Attorney, Agent, or Firm* — Wolf, Greenfield & Sacks, P.C.

(57) ABSTRACT

Articles and methods for protection of electrodes in electrochemical cells, including protective material precursor layers for use in electrode protective structures, are provided. Certain embodiments relate to electrode protective structures that comprise protective material precursor layers that, upon direct contact with a liquid electrolyte, cause a reaction product to form between the material of the precursor layer and a component of the electrolyte.

21 Claims, 2 Drawing Sheets

(51) Int. Cl.
  *H01M 10/0525* (2010.01)
  *H01M 10/052* (2010.01)
  *H01M 4/02* (2006.01)

(56) References Cited

U.S. PATENT DOCUMENTS

| | | | |
|---|---|---|---|
| 4,833,048 A | 5/1989 | DeJonghe et al. |
| 4,917,974 A | 4/1990 | DeJonghe et al. |
| 4,954,371 A | 9/1990 | Yializis |
| 5,162,175 A | 11/1992 | Visco et al. |
| 5,194,341 A | 3/1993 | Bagley et al. |
| 5,324,599 A | 6/1994 | Oyama et al. |
| 5,441,831 A | 8/1995 | Okamoto et al. |
| 5,516,598 A | 5/1996 | Visco et al. |
| 5,529,860 A | 6/1996 | Skotheim et al. |
| 5,538,812 A | 7/1996 | Lee et al. |
| 5,601,947 A | 2/1997 | Skotheim et al. |
| 5,648,187 A | 7/1997 | Skotheim |
| 5,681,615 A | 10/1997 | Affinito et al. |
| 5,690,702 A | 11/1997 | Skotheim et al. |
| 5,723,230 A | 3/1998 | Naoi et al. |
| 5,783,330 A | 7/1998 | Naoi et al. |
| 5,792,575 A | 8/1998 | Naoi et al. |
| 5,853,917 A | 12/1998 | Fauteux et al. |
| 5,882,819 A | 3/1999 | Naoi et al. |
| 5,919,587 A | 7/1999 | Mukherjee et al. |
| 5,961,672 A | 10/1999 | Skotheim et al. |
| 6,117,590 A | 9/2000 | Skotheim et al. |
| 6,153,337 A | 11/2000 | Carlson et al. |
| 6,201,100 B1 | 3/2001 | Gorkovenko et al. |
| 6,214,061 B1 | 4/2001 | Visco et al. |
| 6,306,545 B1 | 10/2001 | Carlson et al. |
| 6,413,284 B1 | 7/2002 | Chu et al. |
| 6,413,285 B1 | 7/2002 | Chu et al. |
| 6,432,584 B1 | 8/2002 | Visco et al. |
| 6,737,197 B2 | 5/2004 | Chu et al. |
| 7,070,632 B1 | 7/2006 | Visco et al. |
| 7,160,603 B2 | 1/2007 | Carlson |
| 7,175,937 B2 | 2/2007 | Cho et al. |
| 7,247,408 B2 | 7/2007 | Skotheim et al. |
| 7,432,017 B2 | 10/2008 | Visco et al. |
| 7,771,870 B2 | 8/2010 | Affinito et al. |
| 7,785,730 B2 | 8/2010 | Affinito et al. |
| 8,076,024 B2 | 12/2011 | Affinito et al. |
| 8,087,309 B2 | 1/2012 | Kelley et al. |
| 8,105,717 B2 | 1/2012 | Skotheim et al. |
| 8,114,171 B2 | 2/2012 | Visco et al. |
| 8,182,943 B2 | 5/2012 | Visco et al. |
| 8,197,971 B2 | 6/2012 | Skotheim et al. |
| 8,202,649 B2 | 6/2012 | Visco et al. |
| 8,334,075 B2 | 12/2012 | Visco et al. |
| 8,338,034 B2 | 12/2012 | Affinito et al. |
| 8,415,054 B2 | 4/2013 | Skotheim et al. |
| 2004/0253510 A1 | 12/2004 | Jonghe et al. |
| 2005/0008938 A1 | 1/2005 | Cho et al. |
| 2005/0095504 A1 | 5/2005 | Kim et al. |
| 2005/0175894 A1 | 8/2005 | Visco et al. |
| 2005/0186469 A1 | 8/2005 | De Jonghe et al. |
| 2006/0115579 A1 | 6/2006 | Mukherjee et al. |
| 2006/0121345 A1 | 6/2006 | Yasuda et al. |
| 2006/0147801 A1 | 7/2006 | Yasuda et al. |
| 2006/0147802 A1 | 7/2006 | Yasuda et al. |
| 2006/0238203 A1 | 10/2006 | Kelley et al. |
| 2007/0221265 A1 | 9/2007 | Affinito et al. |
| 2007/0224502 A1 | 9/2007 | Affinito et al. |
| 2008/0187663 A1 | 8/2008 | Affinito |
| 2008/0318128 A1 | 12/2008 | Simoneau et al. |
| 2009/0029238 A1 | 1/2009 | Schubert et al. |
| 2009/0071835 A1 | 3/2009 | De Jonghe et al. |
| 2009/0200986 A1 | 8/2009 | Kopera |
| 2010/0035128 A1 | 2/2010 | Scordilis-Kelley et al. |
| 2010/0129699 A1 | 5/2010 | Mikhaylik et al. |
| 2010/0239914 A1 | 9/2010 | Mikhaylik et al. |
| 2010/0327811 A1 | 12/2010 | Affinito et al. |
| 2011/0059361 A1 | 3/2011 | Wilkening et al. |
| 2011/0068001 A1 | 3/2011 | Affinito et al. |
| 2011/0070491 A1 | 3/2011 | Campbell et al. |
| 2011/0070494 A1 | 3/2011 | Campbell et al. |
| 2011/0076560 A1 | 3/2011 | Scordilis-Kelley et al. |
| 2011/0177398 A1 | 7/2011 | Affinito et al. |
| 2011/0206992 A1 | 8/2011 | Campbell et al. |
| 2012/0048729 A1 | 3/2012 | Mikhaylik et al. |
| 2012/0070746 A1 | 3/2012 | Mikhaylik et al. |
| 2012/0219842 A1 | 8/2012 | Visco et al. |
| 2012/0270112 A1 | 10/2012 | Visco et al. |
| 2013/0017441 A1 | 1/2013 | Affinito et al. |
| 2013/0095380 A1 | 4/2013 | Affinito et al. |
| 2013/0141050 A1 | 6/2013 | Visco et al. |
| 2013/0224601 A1 | 8/2013 | Burnside et al. |
| 2013/0252103 A1 | 9/2013 | Mikhaylik et al. |
| 2014/0123477 A1 | 5/2014 | Safont Sempere et al. |
| 2014/0193723 A1 | 7/2014 | Kumaresan et al. |
| 2014/0205912 A1 | 7/2014 | Skotheim et al. |
| 2014/0272594 A1 | 9/2014 | Safont Sempere et al. |
| 2014/0272597 A1 | 9/2014 | Mikhaylik et al. |
| 2015/0010804 A1 | 1/2015 | Laramie et al. |
| 2015/0086837 A1 | 3/2015 | Laramie et al. |

FOREIGN PATENT DOCUMENTS

| | | |
|---|---|---|
| WO | WO 02/15297 A2 | 2/2002 |
| WO | WO 2009/017726 A1 | 2/2009 |
| WO | WO 2009/042071 A9 | 4/2009 |
| WO | WO 2009/054987 A1 | 4/2009 |
| WO | WO 2009/089018 A2 | 7/2009 |
| WO | WO 2011/028251 A2 | 3/2011 |

OTHER PUBLICATIONS

Dominey, Lithium Batteries, New Materials, Developments and Perspectives, Chapter 4. Elsevier, Amsterdam. 1994; 137-165.
Nuyken and Pask, Ring-opening polymerization—an introductory review. Polymers. 2013; 5:361-403.
International Search Report and Written Opinion for PCT/US2014/050329 dated Nov. 21, 2014.
Extended European Search Report for EP 14834300.7 dated Dec. 12, 2016.

SELF-HEALING ELECTRODE PROTECTION IN ELECTROCHEMICAL CELLS

RELATED APPLICATIONS

This application claims priority to U.S. Provisional Application No. 61/863,502, filed Aug. 8, 2013, which is incorporated herein by reference in its entirety for all purposes.

GOVERNMENT FUNDING

This invention was made with government support under Grant No. DE-AR0000067 awarded by the Department of Energy ARPA-E program (ARPA-E BEEST DE-FOA-00000207-1536). The government has certain rights in the invention.

FIELD

Articles and methods for protection of electrodes in electrochemical cells, including protective material precursor layers for use in electrode protective structures, are provided.

BACKGROUND

There has been considerable interest in recent years in developing high energy density batteries with lithium containing anodes. Lithium metal is particularly attractive as the anode of electrochemical cells because of its extremely light weight and high energy density, compared for example to anodes, such as lithium intercalated carbon anodes, where the presence of non-electroactive materials increases weight and volume of the anode, and thereby reduces the energy density of the cells, and to other electrochemical systems with, for example, nickel or cadmium electrodes. Lithium metal anodes, or those comprising mainly lithium metal, provide an opportunity to construct cells which are lighter in weight, and which have a higher energy density than cells such as lithium-ion, nickel metal hydride or nickel-cadmium cells. These features are highly desirable for batteries for portable electronic devices such as cellular phones and laptop computers where a premium is paid for low weight. Unfortunately, the reactivity of lithium and the associated cycle life, dendrite formation, electrolyte compatibility, fabrication and safety problems have hindered the commercialization of lithium cells.

Although there have been developments in protected lithium anodes, improvements are needed.

SUMMARY

Articles and methods for protection of electrodes in electrochemical cells, including protective material precursor layers for use in electrode protective structures, are provided. The subject matter of the present invention involves, in some cases, interrelated products, alternative solutions to a particular problem, and/or a plurality of different uses of one or more systems and/or articles.

In one aspect of the invention, an electrode for an electrochemical cell is provided. The electrode comprises an electroactive material and a protective material precursor positioned between the electroactive material and an electrolyte used with the cell, the precursor selected to react with a component of an electrolyte used with the cell to generate a blocking material that inhibits interaction of the electrolyte with the electroactive material.

In one set of embodiments, an electrochemical cell is provided. The electrochemical cell comprises an electrode comprising an electroactive material, an electrolyte; and a protective structure positioned between the electroactive material and the electrolyte. The protective structure comprises a precursor material that is configured to react with a component of the electrolyte to generate a blocking material that inhibits interaction of the electrolyte with the electroactive material.

In another set of embodiments, a series of methods are provided. In one embodiment, a method comprises: in an electrochemical cell comprising an electrode comprising an electroactive material, an electrolyte, and a protective structure positioned between the electroactive material and the electrolyte, wherein the protective structure comprises a precursor material that is configured to react with a component of the electrolyte, performing the steps of: reacting at least a portion of the precursor material with a component of the electrolyte so as to generate a blocking material that inhibits interaction of the electrolyte with the electroactive material.

In another embodiment, a method comprises: in an electrochemical cell comprising an anode, a cathode, and an electrolyte positioned between the anode and the cathode, performing the steps of: forming a blocking material in a crack or a defect of a protective structure positioned between one of the anode and cathode and the electrolyte; and substantially inhibiting interaction between a component of the electrolyte and an electroactive material of the anode or cathode.

In the electrodes, electrochemical cells, and/or methods described above and herein, in some embodiments, the protective structure comprises an ion-conductive layer positioned between the electroactive material and the electrolyte. In some instances, the ion-conductive layer may include a first side, facing the electrolyte, which is essentially free of the precursor material such that the precursor material is shielded from the electrolyte during use of the cell in the absence of a crack or void in the ion-conductive layer that exposes the electrolyte to the precursor material.

In certain embodiments, the ion conductive layer comprises a ceramic material. Additionally or alternatively, the ion conductive layer comprises a polymeric material. The ion-conductive layer may be conductive to lithium ions. In certain embodiments, for example, the ion conductive material comprises one or more of $Li_2O$, $Li_3N$, $Al_2O_3$, $ZrO_2$, $SiO_2$, $CeO_2$, $Al_2TiO_5$, and an oxy-sulfide glass.

In the electrodes, electrochemical cells, and/or methods described above and herein, in some embodiments, the precursor material is in the form of a precursor layer positioned adjacent the ion-conductive layer. In some cases, the precursor material is at least partially embedded within the ion-conductive layer.

In the electrodes, electrochemical cells, and/or methods described above and herein, in some embodiments, the electrode is an anode. In some cases, the anode comprises lithium.

In the electrodes, electrochemical cells, and/or methods described above and herein, in some embodiments, the electrochemical cell further comprising a polymer layer positioned between the electroactive material and the electrolyte.

In the electrodes, electrochemical cells, and/or methods described above and herein, in some embodiments, the precursor material reacts with a component of the electrolyte in a polymerization reaction. The polymerization reaction may be, for example, a cationic, anionic, radical, metathesis, and/or oxidative polymerization reaction.

In the electrodes, electrochemical cells, and/or methods described above and herein, in some embodiments, the electrolyte comprises a monomer that can undergo a polymerization reaction. The electrolyte may comprise, for example, a cyclic ether, a cyclic acetal, a cyclic ester, a vinyl ether, an olefin, a lactone, a thiolactone, a lactam, an oxazoline, a cyclo-silazane, a cyclo-silane, a cyclo-siloxane, a cyclo-carboxylate, a cyclic phosphirene, a quinomethane, and/or a lactide. In some embodiments, the electrolyte comprises 1,3-dioxolane.

In the electrodes, electrochemical cells, and/or methods described above and herein, in some embodiments, the precursor material comprises a Lewis acid, an acidic salt, an organic anhydride, an inorganic anhydride, a transition metal oxide, or a high-voltage Li-transition metal oxide.

In the electrodes, electrochemical cells, and/or methods described above and herein, in some embodiments, the blocking material is substantially non-conductive to ions of the electroactive material. In other embodiments, the blocking material may be conductive to ions of the electroactive material.

In the electrodes, electrochemical cells, and/or methods described above and herein, in some embodiments, the protective structure has a thickness of at least 500 nm and less than or equal to 1 mm.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
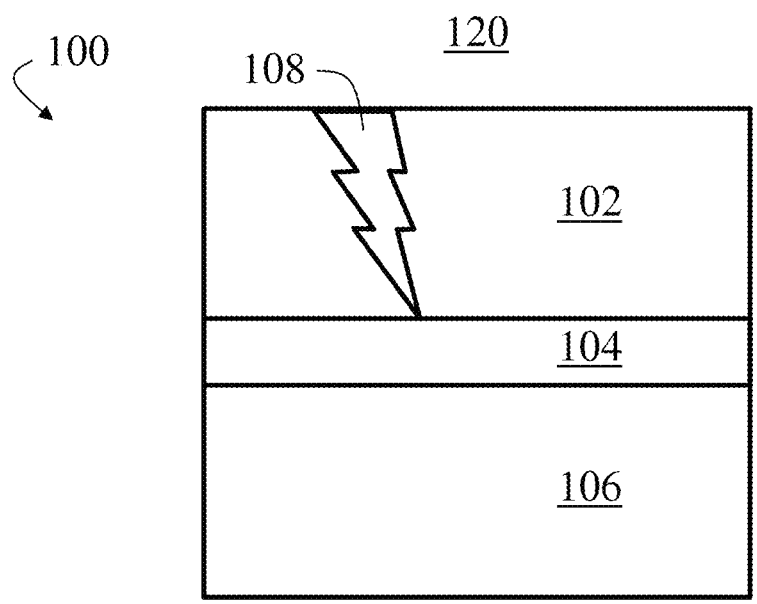
FIG. 1A is an exemplary cross-sectional schematic illustration of a protective structure for an electrode that includes a precursor layer positioned between two ion conductive layers, according to some embodiments.

Articles and methods for protection of electrodes in electrochemical cells, including protective material precursor layers for use in electrode protective structures, are provided. Certain embodiments relate to electrode protective structures that comprise protective material precursor layers that, upon direct contact with a liquid electrolyte, cause a reaction product to form between the material of the precursor layer and a component of the electrolyte. In some embodiments, the reaction results in a polymerization reaction such that a polymeric material forms. The protective structure can be configured such that at least portions of the structure "self-heal" to mitigate further propagation of cracks, defects, or voids within the structure, and/or to block fluid and/or other species from the electrolyte from passing across the protective layer. For instance, the reaction product may act as a blocking material that inhibits interaction of the electrolyte with the electroactive material of the electrode.

Structures to protect an electrode (e.g., a lithium anode) in an electrochemical cell (e.g., a lithium rechargeable battery) are known in the art. Some such structures are described, for example, in U.S. Pat. Nos. 7,771,870; 7,785,730; 8,076,024; 8,338,034; 8,415,054; 8,105,717; and 8,197,971, all of which are incorporated by reference in their entireties into the present disclosure. For example, U.S. Pat. No. 8,105,717 describes an electrochemical cell comprising an anode active layer and a multi-layer protective structure positioned between the anode and an electrolyte, where the multi-layer protective structure comprises at least one ion-conductive layer. In some such protective structures, some layers, such as an ion-conductive layer, may comprise a brittle material, such as a ceramic. In some embodiments, the ion conductive material layer undergo damage or cracking during use. In some cases, a defect or crack (e.g., fracture) may form in the one or more layers of the ion conductive layer, and the defect or crack may propagate through the protective structure. When an electrochemical cell comprising a protective structure with such a defect or crack operates with a liquid electrolyte, the liquid electrolyte can flow into the defect or crack and result in a concentration of current in the crack. This can lead to non-uniform electrochemical process distribution, and it can contribute to further crack development.

Certain embodiments described herein relate to enhanced electrode protective structures that comprise a protective material precursor layer that, upon direct contact with an electrolyte, causes a reaction product to form between the material of the precursor layer and a component of the electrolyte (e.g., a polymerization reaction). In some embodiments, the protective material precursor layer (also referred to herein as a "precursor layer") may be at least partially embedded in and/or adjacent an ion-conductive layer of an electrode protective structure, which layer may comprise a brittle material or a material that may undergo damage or cracking during use. The precursor layer may serve to form a substantially impervious protective structure, along with one or more ion conductive layers, for inhibiting species (e.g., liquid electrolyte and/or species within the electrolyte) from passing across the protective structure. The function of the precursor layer in a protective structure may also be, in certain embodiments, to inhibit the propagation of cracks, particularly through cracks (e.g., voids) that may form perpendicular to the face of the protective structure. In some such embodiments, inhibition of crack growth in the protective structure may prevent current concentration in cracks or defects within the protective structure. In certain embodiments, if a through crack in the protective structure allows liquid electrolyte to reach the precursor layer, contact between the liquid electrolyte (or a species within the liquid electrolyte) and the precursor layer may cause a physical blockage to reduce or prevent fluid (e.g., the electrolyte solvent), or species within the fluid, to further penetrate across the layer. Additionally, in some instances, the interaction of the electrolyte with the precursor layer can form a non-conductive or minimally-conductive (e.g., non- or minimally-electronically conductive and/or non- or minimally-ionically conductive), blocking material (e.g., a polymerized blocking material) that terminates the ion current path and reduces diffusion along the crack path (e.g., void). In some cases, the formation of a reaction product (e.g., a polymer as a result of polymerization) in the cracks or voids may lead to reduced or zero current in the crack, with current uniformly distributed over the crack-free/void-free surface. In certain embodiments, it therefore may be desirable to have a precursor layer in a protective structure to increase the robustness of the protective structure and mitigate or eliminate the detrimental effect of defects and/or cracks.

FIG. 1A provides an exemplary cross-sectional schematic illustration of an electrode protective structure, according to one set of embodiments. In FIG. 1A, protective structure 100 comprises ion-conductive layers 102 and 106. The ion-conductive layers may be, for example, ceramic layers. Precursor layer 104 is positioned between (e.g., directly adjacent) ion-conductive layer 102 and ion-conductive layer 106. In FIG. 1A, a crack 108, which is in fluid communication with electrolyte 120, has initiated and propagated through ion-conductive layer 102. Once crack 108 reaches precursor layer 104, however, electrolyte 120 is brought into direct contact with a portion of precursor layer 104. A reactions such as a polymerization reaction can occur (e.g., near or at the position of direct contact), resulting in the formation of a blocking material. Crack propagation can thereby be arrested, and further intrusion of the electrolyte (or species within the electrolyte) across the protective structure may be inhibited. Accordingly, contact between adverse species in the electrolyte and an electroactive material of an electrode (not shown) may be minimized. In some cases, the ion current path along the crack may be terminated.

As used herein, when a layer is referred to as being "adjacent" another layer, it can be directly on, on top of, or adjacent the layer, or an intervening layer may also be present. A layer that is "directly adjacent" or "in contact with" another layer means that no intervening layer is present. Likewise, a layer that is positioned "between" two layers may be directly between the two layers such that no intervening layer is present, or an intervening layer may be present.

Figure 1B:
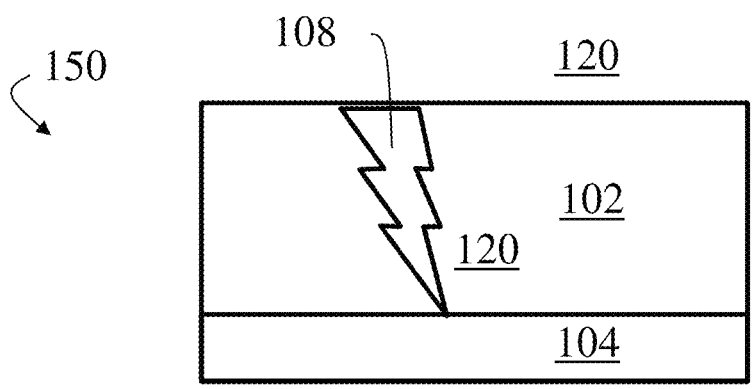
FIG. 1B is an exemplary cross-sectional schematic illustration of a protective structure for an electrode that includes the precursor layer positioned adjacent an ion conductive layer according to some embodiments.

FIG. 1B provides an exemplary cross-sectional schematic illustration of an electrode protective structure that includes only a single ion conductive layer, according to one set of embodiments. In FIG. 1B, a protective structure 150 comprises ion-conductive layer 102. The ion-conductive layer may be, for example, a ceramic layer. Precursor layer 104 is positioned directly adjacent ion-conductive layer 102. In FIG. 1B, crack 108, which is in fluid communication with electrolyte 120, has initiated and propagated through ion-conductive layer 102. Once crack 108 reaches precursor layer 104, however, electrolyte 120 is brought into direct contact with a portion of precursor layer 104. A chemical reaction (e.g., polymerization reaction) can occur (e.g., near or at the position of direct contact), resulting in the formation of a blocking material that prevents electrolyte, or species within the electrolyte, from passing across the protective structure.

Figure 2:
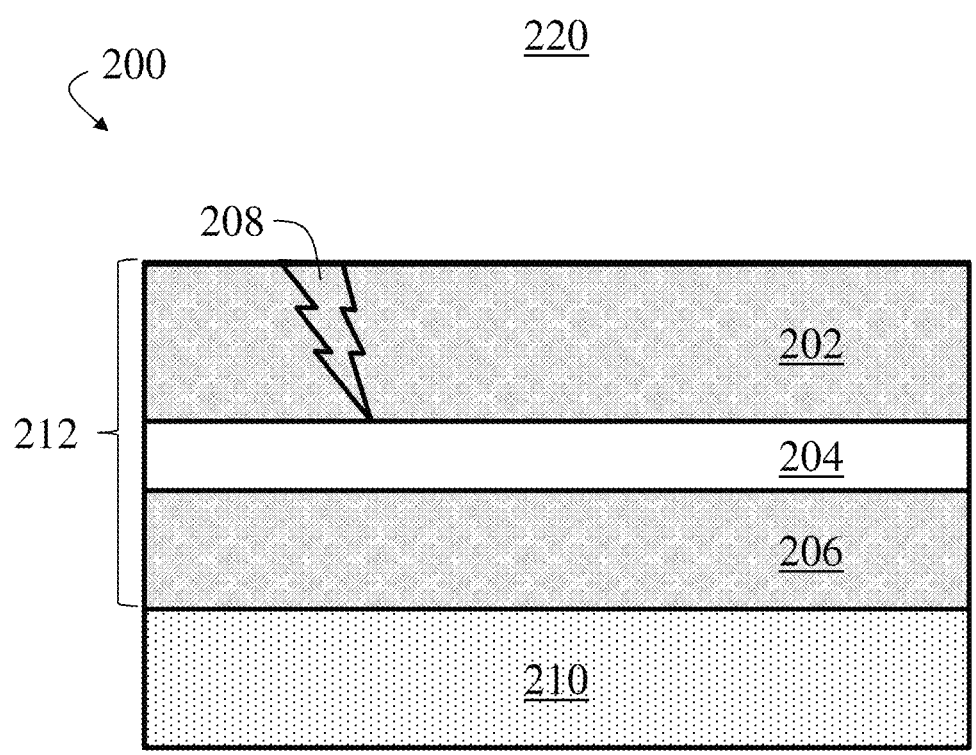
FIG. 2, according to some embodiments, is an exemplary cross-sectional schematic illustration of an electrode with a protective structure.

To provide context for the protective electrode structure, FIG. 2 is an exemplary cross-sectional schematic illustration of an electrode comprising a protective structure, according to one embodiment. In FIG. 2, electrode 200 comprises a layer of electroactive material 210 and a protective structure 212, which is positioned between electroactive material 210 and an electrolyte 220. In the embodiment shown in FIG. 2, protective structure 212 comprises a precursor layer 204 positioned between a first ion-conductive layer 202 and a second ion-conductive layer 206.

During operation of an electrochemical cell comprising electrode 200 and electrolyte 220, a crack 208 may form in ion-conductive layer 202. The crack may propagate through ion-conductive layer 202, and electrolyte 220 may flow through crack 208. However, once electrolyte 220 comes into direct contact with precursor layer 204, the formation of a reaction product (e.g., a polymerization reaction) may occur, and a blocking material (e.g., a non-conductive blocking material) may form. The resulting blocking material may inhibit fluidic and/or ionic interaction of electrolyte 220 with electroactive material 210.

It should be appreciated that while FIGS. 1 and 2 show various components of exemplary protective structures, not all such components need be present in all embodiments. Furthermore, additional components not shown in figures may be present in some embodiments. For instance, although ion conductive layer 106 of FIG. 1A may be described as a brittle layer, such as a ceramic, in some embodiments, in other embodiments the ion conductive layer may include an-ion conductive polymer layer. In other embodiments, an intervening layer, such as an ion-conductive polymer layer, may be present between electrolyte 120 and ion conductive layer 102 (e.g., a ceramic layer). In yet other embodiments, alternating ion-conductive layers and precursor layers 104 may be present (e.g., a first ion conductive layer, a first precursor layer, followed by a second ion conductive layer, and a second precursor layer). Additionally, another embodiments, only a single ion conductive layer may be present in the embodiment shown in FIG. 2. Other configurations are also possible.

The precursor layer can be applied to any suitable electrochemical cell comprising a protective structure for an electrode. In some embodiments, it may be desirable to use the precursor layer in lithium-sulfide (Li—S) or lithium ion (Li-ion) systems because such systems may use electrolytes, and/or include species within electrolytes, that can undergo or promote polymerization. For example, electrolytes used in Li—S electrochemical cells can include cyclic ethers, such as tetrahydrofuran (THF), and cyclic acetals, such as 1,3-dioxolane. Cyclic ethers and cyclic acetals can often be polymerized upon initiation by ring-opening catalysts such as Lewis acids (e.g., boron trifluoride ($BF_3$) and phosphorus pentafluoride ($PF_5$)), acidic salts, organic anhydrides, and inorganic anhydrides. In Li-ion electrochemical cells, electrolytes can comprise cyclic esters (e.g., ethylene carbonate), which can undergo ring-opening polymerization upon initiation with Lewis acids (e.g., zinc chloride ($ZnCl_2$)) and/or strong bases (e.g., lithium butoxide, guanidines, and/or amidines).

In some embodiments, one or more solvents and/or species within the electrolyte (e.g., additives) may be polymerizable. Additionally or alternatively, one or more solvents and/or species within the electrolyte (e.g., additives) may promote polymerization. In certain embodiments, the electrolyte (e.g., solvent, additive) for use in the electrochemical cell can be selected based on factors such as its ability to polymerize, as well as its stability and performance in a given electrochemical cell environment. In certain embodiments, all or portions of the electrolyte (e.g., solvent, additive) may be selected based on its ability to form a relatively non-swelling polymer upon polymerization.

In addition to the cyclic ethers and cyclic acetals that can be used in Li—S electrochemical cells and the cyclic esters that can be used in Li-ion electrochemical cells, polymerizable species such as solvents that may be suitable for use in electrolytes include, but are not limited to, vinyl ethers, olefins, lactones (e.g., gamma-butyrolactone and delta-valerolactone), thiolactones, lactams (e.g., caprolactam), oxazolines, cyclo-silazanes, cyclo-silanes, cyclo-siloxanes, cyclo-carboxylates, cyclic phosphirene, quinomethanes, and lactides. Other solvents are also possible.

In some embodiments, the protective material precursor (i.e., precursor layer) may comprise a catalyst and/or or an initiator of polymerization. Generally, the precursor layer material can be selected based on factors such as the electrolyte or polymerizable additive used in a particular electrochemical cell and the potential polymerization reactions that one or more components of the electrolyte may undergo. Non-limiting examples of suitable precursor layer materials (which may form all, or a portion, of the precursor layer) include, but are not limited to, acids (e.g., Lewis acids, acidic salts), organic materials (e.g., organic anhydrides), inorganic materials (e.g., inorganic anhydrides, transition metal oxides, high-voltage Li-transition metal oxides); R-Me, where R is an aliphatic (e.g., alkyl, alkeynyl) or aromatic (e.g., aromatic radical); e.g., in some embodiments, R may be substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; and where Me is or comprises an alkali metal (e.g., Li, Na, K, Rb, or Cs), an alkali earth metal (e.g., Mg, Ca), an alkali metal alcoholate (e.g., alcoholate of Li, Na, or K); an alkali metal silanoate (e.g., silanolate of Li, Na, or K); carboxylates such as RCOOMe, where R is an aliphatic (e.g., alkyl, alkeynyl) or aromatic (e.g., aromatic radical) and Me is Li, Na, or K; and thiolates such as R—S-Me, where R is an aliphatic (e.g., alkyl, alkeynyl) or aromatic (e.g., aromatic radical) and Me is or comprises an alkali metal (e.g., Li, Na, K, Rb, or Cs), an alkali earth metal (e.g., Mg, Ca); a lactam anion, an amine, or an aluminum trialkoxide.

The term "aliphatic", as used herein, includes both saturated and unsaturated, straight chain (i.e., unbranched), branched, acyclic, cyclic, or polycyclic aliphatic hydrocarbons, which are optionally substituted with one or more functional groups. As will be appreciated by one of ordinary skill in the art, "aliphatic" is intended herein to include, but is not limited to, alkyl, alkenyl, alkynyl, cycloalkyl, cycloalkenyl, and cycloalkynyl moieties. Thus, as used herein, the term "alkyl" includes straight, branched and cyclic alkyl groups. For example, "alkyl" may include straight, branched and cyclic alkyl groups and may encompass both substituted and unsubstituted groups (e.g., S, O, and/or N). An analogous convention applies to other generic terms such as "alkenyl", "alkynyl", and the like. Furthermore, as used herein, the terms "alkyl", "alkenyl", "alkynyl", and the like encompass both substituted and unsubstituted groups. In certain embodiments, as used herein, "lower alkyl" is used to indicate those alkyl groups (cyclic, acyclic, substituted, unsubstituted, branched or unbranched) having 1-6 carbon atoms.

In certain embodiments, the alkyl, alkenyl, and alkynyl groups employed in the compounds described herein (e.g., R) contain 1-20 aliphatic carbon atoms. For example, in some embodiments, an alkyl, alkenyl, or alkynyl group may have greater than or equal to 2 carbon atoms, greater than or equal to 4 carbon atoms, greater than or equal to 6 carbon atoms, greater than or equal to 8 carbon atoms, greater than or equal to 10 carbon atoms, greater than or equal to 12 carbon atoms, greater than or equal to 14 carbon atoms, greater than or equal to 16 carbon atoms, or greater than or equal to 18 carbon atoms. In some embodiments, an alkyl, alkenyl, or alkynyl group may have less than or equal to 20 carbon atoms, less than or equal to 18 carbon atoms, less than or equal to 16 carbon atoms, less than or equal to 14 carbon atoms, less than or equal to 12 carbon atoms, less than or equal to 10 carbon atoms, less than or equal to 8 carbon atoms, less than or equal to 6 carbon atoms, less than or equal to 4 carbon atoms, or less than or equal to 2 carbon atoms. Combinations of the above-noted ranges are also possible (e.g., greater than or equal to 2 carbon atoms and less than or equal to 6 carbon atoms). Other ranges are also possible.

Illustrative aliphatic groups include, but are not limited to, for example, methyl, ethyl, n-propyl, isopropyl, cyclopropyl, —CH$_2$-cyclopropyl, vinyl, allyl, n-butyl, sec-butyl, isobutyl, tert-butyl, cyclobutyl, —CH$_2$-cyclobutyl, n-pentyl, sec-pentyl, isopentyl, tert-pentyl, cyclopentyl, —CH$_2$-cyclopentyl, n-hexyl, sec-hexyl, cyclohexyl, —CH$_2$-cyclohexyl moieties and the like, which again, may bear one or more substituents. Alkenyl groups include, but are not limited to, for example, ethenyl, propenyl, butenyl, 1-methyl-2-buten-1-yl, and the like. Representative alkynyl groups include, but are not limited to, ethynyl, 2-propynyl (propargyl), 1-propynyl, and the like.

An aromatic radical may be, for example, a cyclic aromatic radical having from five to ten ring atoms that include C, optionally with zero, one, or two ring atoms being heteroatoms independently selected from S, O, and N. The term "independently selected" is used herein to indicate that the groups can be identical or different.

Upon direct contact between the electrolyte and the precursor layer, any suitable chemical reaction resulting in a product that inhibits fluidic flow can occur. Examples of reactions that may occur include, but are not limited to, polymerization, precipitation, and particulate formation. Non-limiting examples of polymerization mechanisms include free radical, cationic, anionic, metathesis, and oxidative mechanisms. In some embodiments, the electrolyte solvent and/or additive may comprise one or more types of cyclic monomers. A cyclic monomer may include, for example, a cyclic moiety having from five to ten ring atoms that include C, optionally with zero, one, or two ring atoms being heteroatoms independently selected from S, O, and N. In some such embodiments, the cyclic monomers may undergo a ring-opening polymerization reaction. In certain cases, the electrolyte solvent and/or additive may comprise one or more types of non-cyclic monomers.

In some embodiments, polymerization of one or more components of the electrolyte can occur through cationic polymerization. Cationic polymerization generally refers to a type of polymerization in which a cationic initiator transfers charge to a monomer, which becomes reactive and then goes on to react similarly with other monomers to form a polymer. Examples of cyclic monomers that may undergo cationic polymerization reactions include, but are not limited to, ethers, thioethers, amines, lactones, thiolactones, lactams, silicones, and phosphazenes. Examples of non-cyclic monomers that may undergo cationic polymerization reactions include, but are not limited to, acrylates, vinyl-substituted radicals, and epoxies. Initiators that are suitable for cationic polymerization reactions include Lewis acids, anhydrates, acidic salts, acids, and polyacids. As described herein, one or more such monomers may be present in an electrolyte described herein. As a particular, non-limiting example, in an electrochemical cell comprising an Li—S anode, an electrolyte may comprise 1,3-dioxolane, which can be polymerized through a ring-opening cationic mechanism. Direct contact between the 1,3-dioxolane and a precursor layer comprising certain acidic salts and/or Lewis acids, such as $P_2O_5$, $BF_3$, $PF_5$, polystyrene sulfonic acid, or $LiPF_6$, can cause cationic polymerization of at least a portion of the 1,3-dioxolane.

Polymerization of an electrolyte solvent and/or additive can also occur through anionic polymerization. Anionic polymerization generally refers to a type of polymerization that is carried out through a carbanion active species and involves chain initiation, chain propagation, and chain termination. Examples of cyclic monomers that may undergo anionic polymerization reactions include, but are not limited to, ethers, thioethers, lactones, thiolactones, lactams, anhydrates, carbonates, silicones, and phosphonites. One or more such monomers may be present in an electrolyte described herein.

Non-limiting examples of suitable initiators for anionic polymerization reactions include R-Me, where R is an aliphatic (e.g., alkyl, alkenyl) or aromatic (e.g., aromatic radical); e.g., in some embodiments, R may be substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; and where Me is or comprises an alkali metal (e.g., Li, Na, K, Rb, or Cs), an alkali earth metal (e.g., Mg, Ca), an alkali metal alcoholate (e.g., alcoholate of Li, Na, or K); an alkali metal silanoate (e.g., silanolate of Li, Na, or K); carboxylates such as RCOOMe, where R is an aliphatic (e.g., alkyl, alkenyl) or aromatic (e.g., aromatic radical) and Me is Li, Na, or K; and thiolates such as R—S-Me, where R is an aliphatic (e.g., alkyl, alkenyl) or aromatic (e.g., aromatic radical) and Me is or comprises an alkali metal (e.g., Li, Na, K, Rb, or Cs), an alkali earth metal (e.g., Mg, Ca); a lactam anion, an amine, or an aluminum trialkoxide. One or more such initiators may be present in a precursor layer described herein.

Polymerization of an additive and/or solvent of the electrolyte can occur through a metathesis mechanism. For example, olefins may undergo a metathesis polymerization reaction. Suitable initiators for metathesis reactions include Group IV transition metal oxides (e.g., $WO_3$, $MoO_3$) and halogenides (e.g., $MoCl_6$). One or more such initiators may be present in a precursor layer described herein.

In some cases, polymerization of at least one component of the electrolyte may occur through oxidative polymerization. Suitable initiators for oxidative polymerization include transition metal oxides and high-voltage Li-transition metal oxides, including many Li-ion cathode materials. One or more such initiators may be present in a precursor layer described herein.

In certain embodiments, polymerization of at least one component of the electrolyte can occur through radical polymerization. Radical polymerization generally refers to a type of polymerization in which a polymer forms by the successive addition of free radical building blocks, which may be formed by a number of different mechanisms. Examples of cyclic monomers that may undergo radical polymerization include, but are not limited to, olefins and disulfides. Examples of non-cyclic monomers that may be used as electrolyte solvents or additives include, but are not limited to, acrylates. For radical polymerization, initiators can be formed when electrolyte components are oxidized after contacting a strong oxidizer, such as a transition metal oxide or a lithiated transition metal oxide, in the precursor layer. For example, an olefin additive may form the following radical cation:

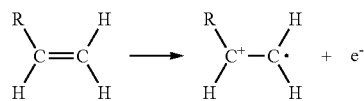

In some embodiments, the average molecular weight ($M_n$) of a monomer in the electrolyte may be greater than or equal to 50 g/mol, 100 g/mol, 150 g/mol, 200 g/mol, 250 g/mol, 300 g/mol, 400 g/mol, 500 g/mol, 600 g/mol, 700 g/mol, 800 g/mol, 900 g/mol, 1000 g/mol, 1100 g/mol, 1200 g/mol, 1300 g/mol, 1400 g/mol, 1500 g/mol, 1800 g/mol, or any other suitable molecular weight. Further, the molecular weight of the monomer may be less than or equal to 2000 g/mol, 1800 g/mol, 1600 g/mol, 1400 g/mol, 1200 g/mol, 1000 g/mol, 800 g/mol, 600 g/mol, 400 g/mol, or any other appropriate molecular weight. Combinations of the above are possible (e.g., a molecular weight of 100 g/mol to 2000 g/mol, 100 g/mol to 1000 g/mol, or 150 g/mol to 400 g/mol). Other combinations are also possible.

Those of ordinary skill in the art can perform a simple screening test to select an electrolyte and a precursor material that would undergo a polymerization reaction upon contact. For example, in one benchtop screening test, an electrolyte candidate may be brought into direct contact with a precursor material candidate, and it can be determined whether reasonably rapid polymerization occurs. In some cases, reasonably rapid polymerization can refer to polymerization that occurs over up to several hours at room temperature. In some cases, polymerization may occur over several seconds or minutes. During this period, electrolyte penetration through the crack or defect would not have a detrimental effect on electrochemical cell performance. A screening test may also involve testing the ability of the resulting polymer to swell in the presence of the electrolyte, e.g., using a solvent uptake test as described herein.

As a result of at least one component of the electrolyte and the precursor layer material undergoing a polymerization reaction, a blocking material that inhibits flow of electrolyte through a crack or defect may be formed. The blocking material may be non-conductive (e.g., non-ionically conductive and/or non-electronically conductive), according to certain embodiments. In some embodiments, polymerization may lead to at least a portion of the electrolyte forming a gel. In other embodiments, however, polymerization may lead to at least a portion of the electrolyte forming a non-swellable polymer (a non-gel substance). In certain cases, polymerization may lead to precipitation of a formed polymer. The formed polymer (e.g., gel or non-swellable polymer) and/or solid precipitate may impede and/or fully block further electrolyte flow and/or passage of species adverse with an electroactive material used with the electrochemical cell. In some cases, the formed polymer and/or solid precipitate may physically impede and/or block electrolyte flow. For example, the polymer and/or solid precipitate may physically obstruct passage through a crack or defect, such that the electrolyte is unable to flow along the crack or defect pathway past the polymer and/or solid precipitate. In certain cases, the formed polymer and/or solid precipitate may chemically impede and/or block electrolyte flow. Non-limiting examples of chemical impedance include hydrophobic or hydrophilic impedance. In some embodiments, polymerization of at least one component of the electrolyte may reduce ionic conductivity, current density, and/or solvent diffusion in the crack or defect. In certain embodiments, the overall ionic conductivity across the protective structure does not change substantially after formation of a crack and subsequent polymerization, since the area/volume of the crack is small compared to the area/volume of the overall protective structure.

The resulting polymer formed by a chemical reaction described herein, as part of the protective structure, can be configured to be substantially electronically non-conductive, in certain embodiments, which can inhibit the degree to which the polymer causes short circuiting of the electrochemical cell. In certain embodiments, all or part of the polymer can be formed of a material with a bulk electronic resistivity of at least about $10^4$, at least about $10^5$, at least about $10^{10}$, at least about $10^{15}$, or at least about $10^{20}$ Ohm-meters. The bulk resistivity may be, for example, less than about $10^{50}$ Ohm-meters, less than about $10^{40}$ Ohm-meters, or less than about $10^{20}$ Ohm-meters. In other embodiments, electronically conductive polymers can be used. Combinations of the above-referenced ranges are also possible.

In some embodiments, the average ionic conductivity (e.g., metal ion, such as lithium ion, conductivity) of the resulting polymer may less than or equal to about less than or equal to 1 S/cm, less than or equal to about $10^{-1}$ S/cm, less than or equal to about $10^{-2}$ S/cm, less than or equal to about $10^{-3}$ S/cm, less than or equal to about $10^{-4}$ S/cm, less than or equal to about $10^{-5}$ S/cm, less than or equal to about $10^{-6}$ S/cm, less than or equal to about $10^{-7}$ S/cm, less than or equal to about $10^{-8}$ S/cm, less than or equal to about $10^{-9}$ S/cm, less than or equal to about $10^{-10}$ S/cm. The average ionic conductivity may be, for example, at least about $10^{-12}$ S/cm, at least about $10^{-11}$ S/cm, at least about $10^{-10}$ S/cm, at least about $10^{-9}$ S/cm, at least about $10^{-7}$ S/cm, at least about $10^{-5}$ S/cm, or at least about $10^{-3}$ S/cm. Combinations of the above-referenced ranges are also possible. Ionic conductivity may be measured at room temperature (e.g., 25 degrees Celsius).

In some embodiments, the average molecular weight (e.g., number average molecular weight, $M_n$) of the resulting polymer may be greater than or equal to 500 g/mol, 1000 g/mol, 2000 g/mol, 5000 g/mol, 10,000 g/mol, 15,000 g/mol, 20,000 g/mol, 50,000 g/mol, 100,000 g/mol, or any other appropriate molecular weight. Further, the molecular weight of the resulting polymer may be less than 1,000,000 g/mol, 500,000 g/mol, 400,000 g/mol, 300,000 g/mol, 200,000 g/mol, 100,000 g/mol, 50,000 g/mol, 20,000 g/mol, 15,000 g/mol, 10,000 g/mol, 5000 g/mol, or any other appropriate molecular weight. Combinations of the above are possible (e.g. a molecular weight of 1000 g/mol to 1,000,000 g/mol or 5000 g/mol to 20,000 g/mol). Other combinations are also possible. The molecular weight can be determined by known methods, in particular by gel permeation chromatography (GPC).

In some embodiments, the volume of polymer (e.g., polymer formed by a chemical reaction between a component of the electrolyte and a component of the precursor layer) in a protective structure may be at least 0.01%, at least 0.1%, at least 1%, at least about 5%, or at least about 10% of the total volume of material in the structure. The volume of polymer in the protective structure may be less than or equal to about 20%, less than or equal to about 10%, less than or equal to about 5%, or less than or equal to about 5% of the total volume of material in the structure. Combinations of the above-referenced ranges are also possible.

In some embodiments, the mass/weight of polymer (e.g., polymer formed by a chemical reaction between a component of the electrolyte and a component of the precursor layer) in a protective structure may be at least 0.01%, at least 0.1%, at least 1%, at least about 2%, at least about 5%, at least about 10%, at least about 15%, at least about 20%, at least about 25%, at least about 30%, or at least about 40% of the total mass/weight of material in the structure. The mass/weight of polymer in the protective structure may be less than or equal to about 60%, less than or equal to about 50%, less than or equal to about 40%, less than or equal to about 30%, less than or equal to about 20%, or less than or equal to about 10% of the total mass/weight of material in the structure. Combinations of the above-referenced ranges are also possible.

The protective material precursor layer may be placed in any suitable location within a protective structure. The precursor layer may be positioned such that it is not in direct contact with an electrolyte, or a species within the electrolyte, prior to a crack or other defect forming in a layer of the protective structure, but such that it is in direct contact with the electrolyte, or species within the electrolyte, after the crack or defect forming in the layer. In some embodiments, the precursor layer is positioned such that it is adjacent at least one ion-conductive material layer (e.g., a ceramic or a polymer). In some cases, it may be desirable for the precursor layer to be positioned such that it is between at least one layer of an electroactive material of the electrode and at least one ion-conductive layer. In some cases, the precursor layer is positioned adjacent at least one layer that is susceptible to cracking or otherwise forming defects upon cycling or handling of the electrochemical cell/electrode. For example, the ion-conductive layer may, in some cases, comprise a brittle material, and may therefore be susceptible to cracks and/or defects. A precursor layer that is positioned between an ion-conductive layer and an electroactive material of the electrode may inhibit crack propagation and/or prevent electrolyte or species within the electrolyte from flowing through or across the crack and interacting with the electroactive material. In some cases, the precursor layer may be positioned between two ion-conductive layers, which may have the same or different properties (e.g., material type such as ceramic/polymeric, brittleness, etc.). The precursor layer may also be placed in the middle of an ion-conductive layer. Such an embodiment may be desirable, since the precursor layer will not react with the electrolyte until a crack or pore forms. Optionally, the precursor layer may be positioned at the top or at the bottom of an ion-conductive material layer. In some embodiments, the precursor layer may be placed directly on the surface of the electroactive material of the anode, and additional layers of a protective structure (e.g., ion-conductive layers and/or polymer layers) may be positioned between the liquid electrolyte and the precursor layer.

The thickness of a protective material precursor layer (e.g., within a multi-layered protective structure) may vary over a range from, for example, about 1 nm to about 10 microns. For instance, the thickness of a precursor layer may be between 1-10 nm thick, between 10-100 nm thick, between 100-1000 nm thick, between 1-5 microns thick, or between 5-10 microns thick. The thickness of a precursor layer may be no greater than, e.g., 10 microns thick, no greater than 5 microns thick, no greater than 1000 nm thick, no greater than 800 nm thick, no greater than 500 nm thick, no greater than 250 nm thick, no greater than 100 nm thick, no greater than 50 nm thick, no greater than 25 nm thick, or no greater than 10 nm thick. The thickness of the precursor layer may be at least 1 nm thick, at least 10 nm thick, at least 100 nm thick, at least 250 nm thick, at least 500 nm thick, at least 700 nm thick, or at least 1000 nm thick. Combinations of the above-referenced ranges are also possible. In certain embodiments in which more than one precursor layer is present, each precursor layer may independently have a thickness in one or more of the above-referenced ranges.

As described herein, a protective structure may include a protective layer such as an ion conductive layer. In some embodiments, the ion-conductive material may be selected to be conductive to particular ions such as metal ions. The ion-conductive material may be conductive to lithium ions or other alkali metal ions, according to some embodiments. In some cases, the ion-conductive material may comprise an inorganic material such as a ceramic and/or a glass conductive to metal ions. Suitable glasses include, but are not limited to, those that may be characterized as containing a "modifier" portion and a "network" portion, as known in the art. The modifier may include a metal oxide of the metal ion conductive in the glass. The network portion may include a metal chalcogenide such as, for example, a metal oxide or sulfide. In other cases, the ion-conductive material may comprise or be a polymeric material. Combinations of ion conductive materials and ion conductive material layers within a protective structure are also possible (e.g., a first ion conductive layer that comprises a ceramic and a second ion conductive layer that comprises a polymer). In some embodiments, the ion-conductive material may comprise a material selected from the group consisting of lithium nitrides, lithium silicates, lithium borates, lithium aluminates, lithium phosphates, lithium phosphorus oxynitrides, lithium silicosulfides, lithium germanosulfides, lithium oxides (e.g., $Li_2O$, LiO, $LiO_2$, $LiRO_2$, where R is a rare earth metal), lithium lanthanum oxides, lithium titanium oxides, lithium borosulfides, lithium aluminosulfides, and lithium phosphosulfides, oxy-sulfides, and combinations thereof. In some embodiments, the ion-conductive material may comprise $Al_2O_3$, $ZrO_2$, $SiO_2$, $CeO_2$, and/or $Al_2TiO_5$. The selection of the ion-conductive material will be dependent on a number of factors including, but not limited to, the properties of electrolyte and the anode and cathode used in the cell.

In some embodiments, the average ionic conductivity (e.g., metal ion, such as lithium ion, conductivity) of the inorganic material is at least about $10^{-7}$ S/cm, at least about $10^{-6}$ S/cm, at least about $10^{-5}$ S/cm, at least about $10^{-4}$ S/cm, at least about $10^{-3}$ S/cm, at least about $10^{-2}$ S/cm, at least about $10^{-1}$ S/cm, at least about 1 S/cm, or at least about 10 S/cm. The average ionic conductivity may less than or equal to about 20 S/cm, less than or equal to about 10 S/cm, or less than or equal to 1 S/cm. Ionic conductivity may be measured at room temperature (e.g., 25 degrees Celsius).

As described herein, in some embodiments an ion-conductive material is brittle, or may otherwise be susceptible to damage or cracking during use. However, in other embodiments, an ion-conductive layer is relatively non-brittle (e.g., flexible) and may comprise or be formed of a polymer (e.g., a polymer layer).

Examples of classes of polymers that may be suitable for use in a protective structure (e.g., as a polymer layer) include, but are not limited to, polyamines (e.g., poly (ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton)); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly(vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyolefins (e.g., poly(butene-1), poly(n-pentene-2), polypropylene, polytetrafluoroethylene); polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from the group consisting of polyvinyl alcohol, polyisobutylene, epoxy, polyethylene, polypropylene, polytetrafluoroethylene, and combinations thereof. The mechanical and electronic properties (e.g., conductivity, resistivity) of these polymers are known.

Accordingly, those of ordinary skill in the art can choose suitable polymers based on their mechanical and/or electronic properties (e.g., ionic and/or electronic conductivity), and/or can modify such polymers to be ionically conducting (e.g., conductive towards single ions) and/or electronically conducting based on knowledge in the art, in combination with the description herein. For example, the polymer materials listed above may further comprise salts, for example, lithium salts (e.g., LiSCN, LiBr, LiI, $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, and $LiN(SO_2CF_3)_2$), to enhance ionic conductivity. Salts may be added to the a material at a range of, e.g., 0 to 50 mol %. In certain embodiments, salts are included in at least 5 mol %, at least 10 mol %, at least 20 mol %, at least 30 mol %, at least 40 mol %, or at least 50 mol % of the material. In certain embodiments, additional salts are less than or equal to 50 mol %, less than or equal to 40 mol %, less than or equal to 30 mol %, less than or equal to 20 mol %, or less than or equal to 10 mol % of the material. Combinations of the above-noted ranges are also possible. Other values of mol % are also possible.

In some embodiments, the polymer can be ionically conductive, while in other embodiments, the polymer is substantially ionically non-conductive. In some embodiments, the average ionic conductivity of the polymer is at least about $10^{-7}$ S/cm, at least about $10^{-6}$ S/cm, at least about $10^{-5}$ S/cm, at least about $10^{-4}$ S/cm, at least about $10^{-2}$ S/cm, at least about $10^{-1}$ S/cm. In certain embodiments, the average ionic conductivity of the polymer may be less than or equal to about 1 S/cm, less than or equal to about $10^{-1}$ S/cm, less than or equal to about $10^{-2}$ S/cm, less than or equal to about $10^{-3}$ S/cm, less than or equal to about $10^{-4}$ S/cm, less than or equal to about $10^{-5}$ S/cm, less than or equal to about $10^{-6}$ S/cm, less than or equal to about $10^{-7}$ S/cm, or less than or equal to about $10^{-8}$ S/cm. Combinations of the above-referenced ranges are also possible (e.g., an average ionic conductivity of at least about $10^{-8}$ S/cm and less than or equal to about $10^{-1}$ S/cm). Conductivity may be measured at room temperature (e.g., 25 degrees Celsius).

The polymer may, in some embodiments, be a monomer, a mixture of copolymers, block copolymers, or a combination of two or more polymers that are in an interpenetrating network or semi-interpenetrating network. In alternative embodiments, the polymer may comprise a filler and/or solid additive. The filler and/or solid additive may add strength, flexibility, and/or improved adhesion properties to the polymer. In some embodiments, the polymer may comprise a plasticizer or other additives, including solid phase change materials. Addition of plasticizers may increase flexibility of the polymer and improve thixotropic properties. Addition of solid phase change materials may result in addition of materials that melt at elevated temperatures and thereby act as a heat sink and prevent thermal runaway.

The selection of an appropriate polymer may depend on a number of factors, including the properties of the electrolyte and the anode and cathode used in the electrochemical cell. In some embodiments, the polymer may be selected to exhibit good adhesion to another ion-conductive layer, such as an inorganic material layer (e.g., ceramic, glass, or glassy-ceramic material layer). Adhesion may be assessed by a peel force test. In certain embodiments, to determine relative adhesion strength between two materials (e.g., two layers of materials), a tape test can be performed. Briefly, the tape test utilizes pressure-sensitive tape to qualitatively assess the adhesion between a first layer (e.g., a polymer layer) and a second layer (e.g., an inorganic material layer). In such a test, an X-cut can be made through the first layer (e.g., polymer layer) to the second layer (e.g., an inorganic material layer). Pressure-sensitive tape can be applied over the cut area and removed. If the polymer layer stays on the inorganic material layer, adhesion is good. If the polymer layer comes off with the strip of tape, adhesion is poor. The tape test may be performed according to the standard ASTM D3359-02. In some embodiments, a strength of adhesion between the polymeric material and the inorganic material passes the tape test according to the standard ASTM D3359-02, meaning the inorganic material does not delaminate from the polymer material (or vice versa) during the test.

Examples of polymers that may offer good adhesion to inorganic materials/ceramics include, but are not limited to, polysiloxanes, which may provide flexibility and strength. The polymer may, in certain cases, be selected to be inert to the electrolyte solution and/or Li polysulfide attack. A means of determining the stability of a polymer in an electrolyte solution includes exposing a small sample of the polymer to vapors of an electrolyte solvent. Examples of polymers that may be stable in an electrolyte solution include, but are not limited to, polyurethanes and polysiloxanes. Additional tests that may be conducted on polymers to examine various characteristics include Fourier transform infrared spectroscopy (FTIR) to confirm that a polymer is cured or cross-linked, scanning electron microscopy with energy dispersive x-ray spectroscopy (SEM-EDS) to determine whether a polymer has cracks. Such test and other tests can also be used to determine whether a protective structure comprises discrete layers, interpenetrating networks, or semi-interpenetrating networks. Profilometry can be used to assess how rough the surface of a polymer is, and whether cracks are formed from deposition of the inorganic material (e.g., ceramic material).

The ion-conductive material (regardless of material type) can be configured to be substantially electronically non-conductive, in certain embodiments, which can inhibit the degree to which the material causes short circuiting of the electrochemical cell. In certain embodiments, all or part of the ion-conductive material can be formed of a material with a bulk electronic resistivity of at least about $10^4$ Ohm-meters, at least about $10^5$ Ohm-meters, at least about $10^{10}$ Ohm-meters, at least about $10^{15}$ Ohm-meters, or at least about $10^{20}$ Ohm-meters. The bulk electronic resistivity may be, in some embodiments, less than or equal to about $10^{20}$ Ohm-meters, or less than or equal to about $10^{15}$ Ohm-meters. Combinations of the above-referenced ranges are also possible. Other values of bulk electronic resistivity are also possible.

The thickness of an ion-conductive layer (e.g., within a multi-layered protective structure) may vary over a range from about 1 nm to about 10 microns. For instance, the thickness of the ion conductive material layer may be between 1-10 nm thick, between 10-100 nm thick, between 100-1000 nm thick, between 1-5 microns thick, or between 5-10 microns thick. The thickness of an-ion conductive material layer may be no greater than, e.g., 10 microns thick, no greater than 5 microns thick, no greater than 1000 nm thick, no greater than 500 nm thick, no greater than 250 nm thick, no greater than 100 nm thick, no greater than 50 nm thick, no greater than 25 nm thick, or no greater than 10 nm thick. The thickness of the ion-conductive layer may be at least 1 nm thick, at least 10 nm thick, at least 100 nm thick, at least 250 nm thick, at least 500 nm thick, at least 700 nm thick, or at least 1000 nm thick. Combinations of the above-referenced ranges are also possible. In certain embodiments in which more than one ion-conductive material layers is present, each ion-conductive material layer may independently have a thickness in one or more of the above-referenced ranges.

In some embodiments, the thickness of the protective structure may vary from, e.g., about 2 to 200 microns. For instance, the protective structure may have a thickness of less than about 200 microns, less than about 100 microns, less than about 50 microns, less than about 25 microns, less than about 10 microns, or less than about 5 microns. The protective structure may have a thickness of at least 1 micron, at least 2 microns, at least 5 microns, at least 10 microns, at least 20 microns, or at least 50 microns. Combinations of the above referenced ranges are also possible. The choice of the thickness may depend on cell design parameters such as cycle life. In one embodiment, the thickness of the protective structure is in the range of about 2 to 100 microns. In another embodiment, the thickness of the protective structure is in the range of about 5 to 50 microns. In another embodiment, the thickness of the protective structure is in the range of about 5 to 25 microns. In yet another embodiment, the thickness of the protective structure is in the range of about 10 to 25 microns.

In some embodiments, the average ionic conductivity of the protective structure is at least about $10^{-7}$ S/cm, at least about $10^{-6}$ S/cm, at least about $10^{-5}$ S/cm, at least about $10^{-4}$ S/cm, at least about $10^{-2}$ S/cm, at least about $10^{-1}$ S/cm, at least about 1 S/cm, at least about $10^1$ S/cm, at least about $10^2$ S/cm, at least about $10^3$ S/cm, at least about $10^4$ S/cm, or at least about $10^5$ S/cm. In some instance, the average ionic conductivity of the protective structure may be less than or equal to about $10^5$ S/cm, less than or equal to about $10^4$ S/cm, less than or equal to about $10^3$ S/cm, less than or equal to about $10^2$ S/cm, or less than or equal to about $10^1$ S/cm. Combinations of the above referenced ranges are also possible.

Some aspects of the invention relate to methods for forming electrodes according to the present invention. The layers of the electrode of the present invention may be deposited by any suitable methods, such as, but not limited to physical deposition methods, chemical vapor deposition methods, extrusion, and electroplating. For example, an ion-conductive layer and/or a precursor layer may be deposited by a method such as sputtering, electron beam evaporation, vacuum thermal evaporation, laser ablation, chemical vapor deposition (CVD), thermal evaporation, plasma enhanced chemical vacuum deposition (PECVD), laser enhanced chemical vapor deposition, and jet vapor deposition. Deposition is preferably carried out in a vacuum or inert atmosphere.

As noted above, the electrode and/or protective structures described herein may be arranged in an electrochemical cell comprising an electrolyte. The electrolytes used in electrochemical or battery cells can function as a medium for the storage and transport of ions, and in the special case of solid electrolytes and gel electrolytes, these materials may additionally function as a separator between the anode and the cathode. Any suitable liquid, solid, or gel material capable of storing and transporting ions may be used, so long as the material facilitates the transport of ions (e.g., lithium ions) between the anode and the cathode. The electrolyte is electronically non-conductive to prevent short circuiting between the anode and the cathode. In some embodiments, the electrolyte may comprise a non-solid electrolyte. Suitable non-aqueous electrolytes may include organic electrolytes comprising one or more materials selected from the group consisting of liquid electrolytes, gel polymer electrolytes, and solid polymer electrolytes.

Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, acyclic ethers, cyclic ethers, glymes, polyethers, phosphate esters, siloxanes, dioxolanes, N-alkylpyrrolidones, substituted forms of the foregoing, and blends thereof. Examples of acyclic ethers that may be used include, but are not limited to, diethyl ether, dipropyl ether, dibutyl ether, dimethoxymethane, trimethoxymethane, dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyltetrahydrofuran, 1,4-dioxane, 1,3-dioxolane, and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinylether, diethylene glycol divinylether, triethylene glycol divinylether, dipropylene glycol dimethyl ether, and butylene glycol ethers. Examples of sulfones that may be used include, but are not limited to, sulfolane, 3-methyl sulfolane, and 3-sulfolene. Fluorinated derivatives of the foregoing are also useful as liquid electrolyte solvents. Mixtures of the solvents described herein can also be used. In some cases, aqueous solvents can be used as electrolytes for lithium cells. Aqueous solvents can include water, which can contain other components such as ionic salts. In some embodiments, the electrolyte can include species such as lithium hydroxide, or other species rendering the electrolyte basic, so as to reduce the concentration of hydrogen ions in the electrolyte.

Liquid electrolyte solvents can also be useful as plasticizers for gel polymer electrolytes, i.e., electrolytes comprising one or more polymers forming a semi-solid network. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing, and optionally, one or more plasticizers.

In some embodiments, one or more solid polymers can be used to form an electrolyte. Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming electrolytes, the electrolyte may further comprise one or more ionic electrolyte salts, also as known in the art, to increase the ionic conductivity.

Examples of ionic electrolyte salts for use in the electrolytes described herein include, but are not limited to, LiSCN, LiBr, LiI, LiClO4, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$. Other electrolyte salts that may be useful include lithium polysulfides (Li$_2$Sx), and lithium salts of organic ionic polysulfides (LiSxR)$_n$, where x is an integer from 1 to 20, n is an integer from 1 to 3, and R is an organic group.

As described herein, in some embodiments, an electrolyte may be present as a polymer layer adjacent a protective structure (e.g., on a side opposite the electroactive layer). The polymer layer may be, in some embodiments, a gel polymer layer. In some cases, in addition to being able to function as a medium for the storage and transport of ions, a polymer layer positioned between an anode and cathode can function to screen the anode (e.g., a base electrode layer of the anode) from any cathode roughness under an applied force or pressure, keeping the anode surface smooth under force or pressure, and/or stabilizing any protective structures of the anode by keeping the protective structure pressed between the base electrode layer and the electrolyte layer. In some such embodiments, the polymer layer may be chosen to be compliant and have a smooth surface.

An electrolyte layer including a gel may have a three-dimensional network comprising a liquid and a binder component, in which the liquid is entrained by and not allowed to flow through the binder. Gels can be formed when liquids are entrained within a three-dimensional network of solids upon applying the liquid to the solid network. In some cases, the three-dimensional network within a gel can comprise a liquid entrained within a polymer (e.g., a cross-linked polymer).

One of ordinary skill in the art would be capable of determining the difference between a gel and other combinations of a solid and a fluid (e.g., a polymeric layer that does not form a gel in the presence of a liquid solvent) by measuring, for example, the ability of the gel or polymer layer to absorb a solvent via a solvent uptake test. In some embodiments, the solvent used may be the liquid electrolyte that would be included in an electrochemical cell including the gel/polymer layer. For this test, a dry sample of the polymeric material is weighed. The weighed sample is immersed in a solvent (e.g., a solvent used as part of the electrolyte) for 30 min. The excess solvent is removed by absorbent paper and the sample is weighed again. Generally, upon exposure of the polymeric material to the solvent, the weight of a gel will increase (e.g., by at least 5%, at least 10%, at least 15%, at least 20%, at least 25%, at least 30%; e.g., up to less than or equal to about 200%, up to less than or equal to about 100%, up to less than or equal to about 50%, up to less than or equal to about 20%), while the weight of a polymer in a non-gel form will not substantially increase. A polymer in a non-gel form may have a weight % increase (e.g., relative to the dry weight of the polymer) of, for examples, less than 5%, or less than 3%, or less than 1%.

In some embodiments, an electrolyte comprising a polymer gel is formed by using a hard ionically conductive polymer and optionally swelling at least a portion of the polymer in a solvent to form a gel. In another embodiment, a mixture of hard and softer polymers can be used, in which at least one, or both, of such polymers is ionically conductive. In another embodiment, an electrolyte includes a rigid, non-swelling scaffold (e.g., like a standard separator as described herein), which is filled with a polymer, such as a conductive polymer. The above-noted embodiments may optionally include particles (e.g., silica particles added to the polymers). In some embodiments, the above-noted embodiments may optionally include some degree of crosslinking. The polymers may be swollen in a solvent as described herein.

In some embodiments, a polymer gel may include a polyethersulfone. Polyethersulfones are polymeric materials that exhibit $SO_2$ groups (sulfonyl groups) and oxygen atoms that form part of ether groups in their constitutional repeating units. Polyethersulfones can be aliphatic, cycloaliphatic or aromatic polyethersulfones. In certain embodiments, one or more branched polyimide, polyvinylalcohol or a blend of polyvinylalcohol (PVOH) and additional (co)polymer(s) can be used.

A polymer electrolyte gel may include, in some embodiments, materials based on a polymer (e.g., non-porous polyvinylalcohol) as a non-fluid material swollen with a solvent having affinity to the polymer. E.g., for PVOH, the solvent may include dimethylacetamide (DMAc), N-methylpyrolidone (NMP), dimethylsulfoxide (DMSO), dimethylformamide (DMF), sulfolanes and/or sulfones. In certain embodiments, the polymer may be swollen in a solvent mixture comprising a solvent having affinity to polymer and also solvents having no affinity to the polymer (so-called non-solvents) such as, for PVOH, 1,2.dimethoxyethane (DME), diglyme, triglyme, 1.3-dioxolane (DOL), THF, 1,4-dioxane, cyclic and linear ethers, esters (carbonates as dimethylcarbonate and ethylene carbonate), acetals and ketals. The solvents for preparing the polymer gel may be selected from the solvents described herein and may comprise electrolyte salts, including lithium salts selected from the lithium salts described herein.

In certain embodiments, polymer electrolyte gels may be prepared from branched and hyperbranched polyimides. Hyperbranched polyimides are a subclass of branched polyimides. They are composed of highly branched macromolecules in which any linear subchain may lead in either direction to at least two other subchains.

In other embodiments, polymer electrolyte gels may be prepared materials such as cyanoethylated cellulose, polyether ether ketones and sulfonated polyether ether ketones.

In some embodiments a polymer gel is crosslinked with a suitable cross-linker. Examples of cross-linkers may include ones selected from molecules with two or more carbon-carbon double bonds, e.g., ones with two or more vinyl groups. Particularly useful cross-linkers are selected from di(meth)acrylates of diols such as glycol, propylene glycol, diethylene glycol, dipropylene glycol, 1,3-propanediol, 1,4-butanediol, triethylene glycol, tetrapropylene glycol, cyclopentadiene dimer, 1,3-divinyl benzene, and 1,4-divinyl benzene. Some suitable cross-linkers may comprise two or more epoxy groups in the molecule, such as, for example, bis-phenol F, bis-phenol A, 1,4-butanediol diglycidyl ether, glycerol propoxylate triglycidyl ether, and the like. Cross-linking can be achieved by, for example, adding cross-linker to a polymer and performing a cross-linking reaction, e.g., by thermal or photochemical curing, e.g. by irradiation with such as UV/vis irradiation, by γ-irradiation, electron beams (e-beams) or by heating (thermal cross-linking).

In some embodiments, one or more solid polymers can be used to form an electrolyte. Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In certain embodiments in which an electrolyte layer includes a solid portion (e.g., a solid porous network such as a solid electrolyte and/or a separator), the solid portion may have pores. The pores of the solid portion of the electrolyte layer may have an average size of, for example, greater than 0.01 microns, greater than 0.05 microns, greater than 0.1 microns, greater than 0.5 microns, greater than 1 micron, greater than 2 microns, or greater than 5 microns. In some cases, the pores of the solid portion of the electrolyte layer may have an average size of, for example, less than 5 microns, less than 3 microns, less than 2 microns, less than 1 micron, less than 0.5 microns, less than 0.1 microns, less than 0.05 microns, or less than 0.1 microns. Other sizes are also possible. Combinations of the above-noted ranges are also possible. The pores of the solid portion may contain components such as a liquid electrolyte, a gel, and/or ionic salts. The average pore size can be measured using methods such as mercury porosimetry (e.g., using a mercury porosimeter such as Quanta-Chrome 3300) or using standard ASTM E1294 (2008) (M.F.P.).

In some embodiments, the porosity of an electrolyte layer can be, for example, at least 30%, at least 40%, at least 50%, at least 60%, at least 70%, at least 80%, or at least 90%. In certain embodiments, the porosity is less than 90%, less than 80%, less than 70%, less than 60%, less than 50%, less than 40%, or less than 30%. Other sizes are also possible. Combinations of the above-noted ranges are also possible. Non-porous electrolyte layers are also possible.

In some embodiments, an electrolyte layer described herein may have a thickness of at least 1 micron, at least 5 microns, at least 10 microns, at least 15 microns, at least 20 microns, at least 25 microns, at least 30 microns, at least 40 microns, at least 50 microns, at least 70 microns, at least 100 microns, at least 200 microns, at least 500 microns, or at least 1 mm. In some embodiments, the thickness of the electrolyte layer is less than or equal to 1 mm, less than or equal to 500 microns, less than or equal to 200 microns, less than or equal to 100 microns, less than or equal to 70 microns, less than or equal to 50 microns, less than or equal to 40 microns, less than or equal to 30 microns, less than or equal to 20 microns, less than or equal to 10 microns, or less than or equal to 50 microns. Other values are also possible. Combinations of the above-noted ranges are also possible.

The protected electrode structures described herein may apply to an anode or cathode.

In some embodiments, the electrode may be arranged in an electrochemical cell. That cell, in certain cases, may be a primary (non-rechargeable) battery. In other cases, the electrochemical cell may be a secondary (rechargeable) battery. Many embodiments described herein involve lithium rechargeable batteries. However, wherever lithium batteries are described herein, it is to be understood that any analogous alkali metal battery can be used. Additionally, although embodiments of the invention are particularly useful for protection of a lithium anode, the present invention may be applicable to other applications in which electrode protection is desired.

The electrode described herein may comprise a base layer comprising an active electrode species. In certain cases, the electrode is an anode. The anode, in some embodiments, comprises lithium. The anode may comprise or be formed of lithium metal. The lithium metal may be in the form of, e.g., a lithium metal foil or a thin lithium film that has been deposited on a substrate. The lithium metal may also be in the form of a lithium alloy, such as, for example, a lithium-tin alloy or a lithium-aluminum alloy. In some embodiments, lithium metal may be deposited (e.g., vacuum deposited) directly onto a protective structure described herein.

In some embodiments, the electrode is a cathode. Suitable cathode active materials for use in the cathode of the electrochemical cells of the invention include, but are not limited to, electroactive transition metal chalcogenides, electroactive conductive polymers, and electroactive sulfur-containing materials, and combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In certain embodiments, the cathode may include as an electroactive species elemental sulfur, sulfides, and/or polysulfides. In other embodiments, an intercalation electrode (e.g., a lithium-intercalation cathode) may be used. Non-limiting examples of suitable materials that may intercalate ions of an electroactive material (e.g., alkaline metal ions) include oxides, titanium sulfide, and iron sulfide. Additional examples include $Li_xCoO_2$, $Li_xNiO_2$, $LixMnO_2$, $LixMn_2O_4$, $Li_xFePO_4$, $Li_xCoPO_4$, $Li_xMnPO_4$, and $Li_xNiPO_4$, where (0<x≤1), and $LiNi_xMn_yCo_zO_2$ where (x+y+z=1).

In one embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. In some embodiments, the conductive polymer may be one or more of polypyrroles, polyanilines, and polyacetylenes.

In some embodiments, the electrode is arranged in an electrochemical cell that comprises an electrolyte. The electrolyte can comprise one or more ionic electrolyte salts to provide ionic conductivity and one or more liquid electrolyte solvents, gel polymer materials, or polymer materials, as described herein. For instance, in some embodiments, the electrode may comprise a gel layer (e.g., a gel electrolyte) between the base layer comprising an active species and a protective structure herein (e.g., which may comprise a polymer and an inorganic material). The protective structure may, in some cases, be in direct contact with a gel, an electrolyte, a separator positioned between the anode and the cathode, and/or a temporary carrier substrate in an electrochemical cell.

In some embodiments, there may be a substrate on one side of the electrode. Substrates may be useful as a support on which to deposit the electrode active material, and they may provide additional stability for handling during cell fabrication. Further, in the case of conductive substrates, a substrate may also function as a current collector useful in efficiently collecting the electrical current generated throughout the electrode and in providing an efficient surface for attachment of electrical contacts leading to an external circuit. Suitable substrates include, but are not limited to, those selected from the group consisting of metal foils, polymer films, metallized polymer films, electrically conductive polymer films, polymer films having an electrically conductive coating, electrically conductive polymer films having an electrically conductive metal coating, and polymer films having conductive particles dispersed therein. In one embodiment, the substrate is a metallized polymer film. In other embodiments, described more fully below, the substrate may be selected from non-electrically-conductive materials. In certain embodiments, however, a substrate may not be needed.

An electrochemical cell described herein may include a separator. Generally, a separator is interposed between a cathode and an anode in an electrochemical cell. The separator may separate or insulates the anode and the cathode from each other preventing short circuiting, and permit the transport of ions between the anode and the cathode. The separator may be porous, wherein the pores may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes.

In some embodiments, the porosity of the separator can be, for example, at least 30%, at least 40%, at least 50%, at least 60%, at least 70%, at least 80%, or at least 90%. In certain embodiments, the porosity is less than 90%, less than 80%, less than 70%, less than 60%, less than 50%, less than 40%, or less than 30%. Other sizes are also possible. Combinations of the above-noted ranges are also possible.

Separators may be supplied as porous free standing films which are interleaved with the anodes and the cathodes during the fabrication of cells. Alternatively, the porous separator layer may be applied directly to the surface of one of the electrodes.

A variety of separator materials are known in the art. Examples of suitable solid porous separator materials include, but are not limited to, polyolefins, such as, for example, polyethylenes (e.g., SETELA™ made by Tonen Chemical Corp) and polypropylenes, glass fiber filter papers, and ceramic materials. For example, in some embodiments, the separator comprises a microporous polyethylene film. Further examples of separators and separator materials suitable for use in this invention are those comprising a microporous xerogel layer, for example, a microporous pseudo-boehmite layer, which may be provided either as a free standing film or by a direct coating application on one of the electrodes, as described in U.S. Pat. Nos. 6,153,337 and 6,306,545 by Carlson et al. of the common assignee. Solid electrolytes and gel electrolytes may also function as a separator in addition to their electrolyte function.

In some embodiments, the separator can comprise synthetic or non-synthetic organic polymeric materials, and can be selected from polymer/ceramic material hybrid systems such as polymer non-woven materials coated with a ceramic material. Suitable materials for the separator are polyolefins (e.g., polyethylene or polypropylene) and fluorinated (co) polymers. The separator can comprise a microporous film, in some cases.

The following documents are incorporated herein by reference in their entireties for all purposes: U.S. Pat. No. 7,247,408, filed May 23, 2001, entitled "Lithium Anodes for Electrochemical Cells"; U.S. Pat. No. 5,648,187, filed Mar. 19, 1996, entitled "Stabilized Anode for Lithium-Polymer Batteries"; U.S. Pat. No. 5,961,672, filed Jul. 7, 1997, entitled "Stabilized Anode for Lithium-Polymer Batteries"; U.S. Pat. No. 5,919,587, filed May 21, 1997, entitled "Novel Composite Cathodes, Electrochemical Cells Comprising Novel Composite Cathodes, and Processes for Fabricating Same"; U.S. patent application Ser. No. 11/400,781, filed Apr. 6, 2006, published as U.S. Pub. No. 2007-0221265, and entitled "Rechargeable Lithium/Water, Lithium/Air Batteries"; International Patent Apl. Serial No.: PCT/US2008/009158, filed Jul. 29, 2008, published as International Pub. No. WO/2009017726, and entitled "Swelling Inhibition in Lithium Batteries"; U.S. patent application Ser. No. 12/312,764, filed May 26, 2009, published as U.S. Pub. No. 2010-0129699, and entitled "Separation of Electrolytes"; International Patent Apl. Serial No.: PCT/US2008/012042, filed Oct. 23, 2008, published as International Pub. No. WO/2009054987, and entitled "Primer for Battery Electrode"; U.S. patent application Ser. No. 12/069,335, filed Feb. 8, 2008, published as U.S. Pub. No. 2009-0200986, and entitled "Protective Circuit for Energy-Storage Device"; U.S. patent application Ser. No. 11/400,025, filed Apr. 6, 2006, published as U.S. Pub. No. 2007-0224502, and entitled "Electrode Protection in both Aqueous and Non-Aqueous Electrochemical Cells, including Rechargeable Lithium Batteries"; U.S. patent application Ser. No. 11/821,576, filed Jun. 22, 2007, published as U.S. Pub. No. 2008/0318128, and entitled "Lithium Alloy/Sulfur Batteries"; patent application Ser. No. 11/111,262, filed Apr. 20, 2005, published as U.S. Pub. No. 2006-0238203, and entitled "Lithium Sulfur Rechargeable Battery Fuel Gauge Systems and Methods"; U.S. patent application Ser. No. 11/728,197, filed Mar. 23, 2007, published as U.S. Pub. No. 2008-0187663, and entitled "Co-Flash Evaporation of Polymerizable Monomers and Non-Polymerizable Carrier Solvent/Salt Mixtures/Solutions"; International Patent Apl. Serial No.: PCT/US2008/010894, filed Sep. 19, 2008, published as International Pub. No. WO/2009042071, and entitled "Electrolyte Additives for Lithium Batteries and Related Methods"; International Patent Apl. Serial No.: PCT/US2009/000090, filed Jan. 8, 2009, published as International Pub. No. WO/2009/089018, and entitled "Porous Electrodes and Associated Methods"; U.S. patent application Ser. No. 12/535,328, filed Aug. 4, 2009, published as U.S. Pub. No. 2010/0035128, and entitled "Application of Force In Electrochemical Cells"; U.S. patent application Ser. No. 12/727,862, filed Mar. 19, 2010, entitled "Cathode for Lithium Battery"; U.S. patent application Ser. No. 12/471,095, filed May 22, 2009, entitled "Hermetic Sample Holder and Method for Performing Microanalysis Under Controlled Atmosphere Environment"; U.S. patent application Ser. No. 12/862,513, filed on Aug. 24, 2010, entitled "Release System for Electrochemical cells (which claims priority to Provisional Patent Apl. Ser. No. 61/236,322, filed Aug. 24, 2009, entitled "Release System for Electrochemical Cells"); U.S. patent application Ser. No. 13/216,559, filed on Aug. 24, 2011, published as U.S. Patent Publication No. 2012/0048729, entitled "Electrically Non-Conductive Materials for Electrochemical Cells;" U.S. Provisional Patent Apl. Ser. No. 61/376,554, filed on Aug. 24, 2010, entitled "Electrically Non-Conductive Materials for Electrochemical Cells;" U.S. patent application Ser. No. 12/862,528, filed on Aug. 24, 2010, published as U.S. Patent Publication No. 2011/0177398, entitled "Electrochemical Cell;" U.S. patent application Ser. No. 12/862,563, filed on Aug. 24, 2010, published as U.S. Pub. No. 2011/0070494, entitled "Electrochemical Cells Comprising Porous Structures Comprising Sulfur" [S1583.70029US00]; U.S. patent application Ser. No. 12/862,551, filed on Aug. 24, 2010, published as U.S. Pub. No. 2011/0070491, entitled "Electrochemical Cells Comprising Porous Structures Comprising Sulfur" [S1583.70030US00]; U.S. patent application Ser. No. 12/862,576, filed on Aug. 24, 2010, published as U.S. Pub. No. 2011/0059361, entitled "Electrochemical Cells Comprising Porous Structures Comprising Sulfur" [S1583.70031US00]; U.S. patent application Ser. No. 12/862,581, filed on Aug. 24, 2010, published as U.S. Pub. No. 2011/0076560, entitled "Electrochemical Cells Comprising Porous Structures Comprising Sulfur" [S1583.70024US01]; U.S. patent application Ser. No. 13/240,113, filed on Sep. 22, 2011, published as U.S. Patent Pub. No. 2012/0070746, entitled "Low Electrolyte Electrochemical Cells"; U.S. Patent Apl. Ser. No. 61/385,343, filed on Sep. 22, 2010, entitled "Low Electrolyte Electrochemical Cells"; and U.S. patent application Ser. No. 13/033,419, filed Feb. 23, 2011, published as U.S. Patent Pub. No. 2011/0206992, entitled "Porous Structures for Energy Storage Devices" [S1583.70034US00]; U.S. patent application Ser. No. 13/789,783, filed Mar. 9, 2012, published as U.S. Patent Pub. No. 2013/0252103, and entitled "Porous Support Structures, Electrodes Containing Same, and Associated Methods"; U.S. Patent Pub. Ser. No. 13/644,933, filed Oct. 4, 2012, published as U.S. Patent Pub. No. 2013/0095380, and entitled "Electrode Structure and Method for Making the Same" [S1583.70044US01]; U.S. patent application Ser. No. 14/150,156, filed Jan. 8, 2014, and entitled "Conductivity Control in Electrochemical Cells" [S1583.70049US01]; U.S. patent application Ser. No. 13/833,377, filed Mar. 15, 2013, and entitled "Protective Structures for Electrodes" [S1583.70051US00]; U.S. patent application Ser. No. 14/209,274, filed Mar. 13, 2014, and entitled "Protected Electrode Structures and Methods" [S1583.70052US00]; and U.S. patent application Ser. No. 14/323,269, filed Jul. 3, 2014, and entitled "Ceramic/Polymer Matrix for Electrode Protection in Electrochemical Cells, including Rechargeable Lithium Batteries" [S1583.70062US01]. All other patents and patent applications disclosed herein are also incorporated by reference in their entirety for all purposes.

The following examples are intended to illustrate certain embodiments of the present invention, but do not exemplify the full scope of the invention.

Example 1

10 milligrams (mg) of phosphorus pentoxide, an anhydrate of phosphoric acid, were placed into the capillary of a 5 milliliter (mL) pipette, mimicking the protective precursor material layer that would be positioned adjacent a crack that form in an ion conductive layer of a protected electrode. The pipette capillary was placed in direct contact with a 1,3-dioxolane solvent. The solvent polymerized instantly, clogging the pipette capillary.

Example 2

10 mg of lithium hydrogen sulfate ($LiHSO_4$), an acidic salt, was added to 5 mL of battery grade 1,3-dioxolane, causing solvent polymerization in about 30 seconds.

Example 3

50 mg of $LiPF_6$ was added to 5 mL of battery-grade 1,3-dioxolane, causing solvent polymerization in about 30 minutes.

Example 4

A battery separator, Celgard2400, was used as a substrate for coating of a protective layer with an embedded self-healing (precursor material) layer.

The separator was argon plasma treated to activate its surface and a first ion-conductor layer of 0.5 micron thickness of an oxysulfide ceramic ($Li_2SiS_{(3-x)}Ox$, where x=~0.5-1) was coated using e-beam evaporation. The ceramic was coated with a precursor material layer, a 0.5 micron thick layer of $P_2O_5$, using e-beam evaporation. A second ion-conductor layer of oxysulfide ceramic having a thickness of 0.5 microns was coated on top of the $P_2O_5$ layer. These three coatings produced a protective structure with the precursor material layer of $P_2O_5$ embedded between the ceramic layers. The precursor material layer of $P_2O_5$ serves as a polymerization initiator for 1,3-dioxolane when a dioxolane-containing electrolyte contacts the precursor material layer of $P_2O_5$ through one or more defects in a ceramic layer.

Comparative Example 4

As a comparative example, a single 1 micron thick layer of ion-conductor (oxy sulfide ceramic, $Li_2SiS_{(3-x)}Ox$, where x=~0.5-1) was coated on the surface of a separator.

Example 5

In this prophetic example, each of the protective structures of Example 4 and Comparative Example 4 would be exposed to dioxolane solvent. Dioxolane would be placed on top of the protective layers covering an area of 15 $cm^2$ for each sample. No solvent penetration would be expected during a 30 min exposure. Both protective structures would then be bent to a radius of less than 0.5 cm to promote surface cracking in each of the protective structures. The surface cracking would expose the precursor material layer of Example 4 to the dioxolane solvent, and polymerization of the precursor material would be expected. It is expected that this polymerization would stop penetration of the solvent through the protective layer.

It is also expected that surface cracking of the protective structure of Comparative Example 4 would result in solvent penetration through the protective structure.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrochemical cell, comprising:
   an electrode comprising an electroactive material comprising lithium;
   an electrolyte; and
   a protective structure positioned between the electroactive material and the electrolyte, wherein the protective structure comprises a precursor material that is configured to undergo a polymerization reaction with a component of the electrolyte to generate a blocking material that inhibits interaction of the electrolyte with the electroactive material, wherein the precursor material comprises at least one of a polymerization catalyst and a polymerization initiator, and wherein the blocking material comprises a polymer.

2. An electrochemical cell as in claim 1, wherein the protective structure comprises an ion-conductive layer positioned between the electroactive material and the electrolyte.

3. An electrochemical cell as in claim 2, wherein the precursor material is in the form of a precursor layer positioned adjacent the ion-conductive layer.

4. An electrochemical cell as in claim 2, wherein the precursor material is at least partially embedded within the ion-conductive layer.

5. An electrochemical cell as in claim 2, wherein the ion-conductive layer includes a first side, facing the electrolyte, which is essentially free of the precursor material, and,
   wherein, in the absence of a crack or void in the ion-conductive layer that exposes the electrolyte to the precursor material, the ion-conductive layer shields the precursor material from the electrolyte during use of the cell.

6. An electrochemical cell as in claim 2, wherein the ion-conductive layer comprises a ceramic material.

7. An electrochemical cell as in claim 2, wherein the ion-conductive layer comprises a polymeric material.

8. An electrochemical cell as in claim 2, wherein the ion-conductive layer is conductive to lithium ions.

9. An electrochemical cell as in claim 1, wherein the electrode is an anode.

10. An electrochemical cell as in claim 1, further comprising a polymer layer positioned between the electro active material and the electrolyte.

11. An electrochemical cell as in claim 1, wherein the polymerization reaction is a cationic, anionic, radical, metathesis, and/or oxidative polymerization reaction.

12. An electrochemical cell as in claim 1, wherein the electrolyte comprises a cyclic ether, a cyclic acetal, a cyclic ester, a vinyl ether, an olefin, a lactone, a thiolactone, a lactam, an oxazoline, a cyclo-silazane, a cyclo-silane, a cyclo-siloxane, a cyclo-carboxylate, a cyclic phosphirene, a quinomethane, and/or a lactide.

13. An electrochemical cell as in claim 1, wherein the electrolyte comprises 1,3-dioxolane.

14. An electrochemical cell as in claim 1, wherein the precursor material comprises a Lewis acid, an acidic salt, an organic anhydride, an inorganic anhydride, a transition metal oxide, and/or a high-voltage Li-transition metal oxide.

15. An electrochemical cell as in claim 1, wherein the blocking material is substantially non-conductive to ions of the electroactive material.

16. An electrochemical cell as in claim 2, wherein the ion-conductive layer comprises one or more of $Li_2O$, $Li_3N$, $Al_2O_3$, $ZrO_2$, $SiO_2$, $CeO_2$, $Al_2TiO_5$, and an oxy-sulfide glass.

17. An electrochemical cell as in claim 1, wherein the protective structure has a thickness of at least 500 nm and less than or equal to 1 mm.

18. A method, comprising:
    in an electrochemical cell comprising:
        an electrode comprising an electroactive material comprising lithium;
        an electrolyte; and
        a protective structure positioned between the electroactive material and the electrolyte, wherein the protective structure comprises a precursor material that is configured to undergo a polymerization reaction with a component of the electrolyte, and wherein the precursor material comprises a polymerization initiator,
    performing the steps of:
    reacting at least a portion of the precursor material with a component of the electrolyte so as to generate a blocking material that inhibits interaction of the electrolyte with the electroactive material, wherein the blocking material comprises a polymer.

19. A method, comprising:
in an electrochemical cell comprising an anode comprising lithium, a cathode, and an electrolyte positioned between the anode and the cathode, performing the steps of:
forming a blocking material by a polymerization reaction in a crack or a defect of a protective structure positioned between one of the anode and cathode and the electrolyte, wherein the protective structure comprises a precursor material, wherein the precursor material comprises a polymerization initiator, wherein the blocking material is a reaction product of the precursor material, and wherein the blocking material comprises a polymer; and
substantially inhibiting interaction between a component of the electrolyte and an electroactive material of the anode or cathode.

20. A method as in claim 18, wherein the blocking material is substantially non-conductive to lithium ions.

21. A method as in claim 18, wherein the protective structure comprises a protective layer, and wherein the blocking material has a different composition than the protective layer.

\* \* \* \* \*